United States Patent
Luo et al.

(10) Patent No.: US 11,549,161 B2
(45) Date of Patent: Jan. 10, 2023

(54) GRAPHENE-REINFORCED ALLOY COMPOSITE MATERIAL AND PREPARATION METHOD THEREOF

(71) Applicant: Beijing Feilixin Information Security Technology Co., Ltd., Beijing (CN)

(72) Inventors: Keqing Luo, Beijing (CN); Yongquan Zhu, Beijing (CN); Bo Du, Beijing (CN); Xuquan Zhu, Beijing (CN)

(73) Assignee: Beijing Feilixin Information Security Technology Co., Ltd., Beijing (CN)

( * ) Notice: Subject to any disclaimer, the term of this patent is extended or adjusted under 35 U.S.C. 154(b) by 0 days.

(21) Appl. No.: 17/472,467

(22) Filed: Sep. 10, 2021

(65) Prior Publication Data

US 2022/0178003 A1    Jun. 9, 2022

(30) Foreign Application Priority Data

Dec. 8, 2020  (CN) .......................... 202011444407.5

(51) Int. Cl.
| | | |
|---|---|---|
| *C22C 1/10* | (2006.01) | |
| *C01B 32/194* | (2017.01) | |
| *C01B 32/192* | (2017.01) | |
| *C22C 1/05* | (2006.01) | |

(52) U.S. Cl.
CPC .......... *C22C 1/1005* (2013.01); *C01B 32/192* (2017.08); *C01B 32/194* (2017.08); *C22C 1/058* (2013.01); *C22C 1/1036* (2013.01); *C22C 1/1094* (2013.01); *C22C 2001/1089* (2013.01)

(58) Field of Classification Search
CPC ..... C22C 1/1005; C22C 1/058; C22C 1/1036; C22C 1/1094; C22C 2001/1089; C22C 1/04; C01B 32/192; C01B 32/194; B22F 9/082; B22F 1/145; B22F 1/16; B22F 3/02; B22F 3/10; C23C 16/26
See application file for complete search history.

(56) References Cited

U.S. PATENT DOCUMENTS

| | | | | |
|---|---|---|---|---|
| 5,090,997 A | * | 2/1992 | Birkenstock | .......... C22C 1/0416 |
| | | | | 75/338 |
| 2015/0064045 A1 | * | 3/2015 | Jinnou | .................... B22F 5/106 |
| | | | | 419/10 |

FOREIGN PATENT DOCUMENTS

| | | | | | |
|---|---|---|---|---|---|
| CN | 108320834 A | * | 7/2018 | | ............. H01B 1/026 |
| CN | 108907181 A | * | 11/2018 | | ................ B22F 1/02 |
| CN | 110846529 A | * | 2/2020 | | |
| CN | 110600161 A | * | 11/2020 | | |
| CN | 112725660 A | * | 4/2021 | | |

OTHER PUBLICATIONS

CN-110600161-B (Year: 2020).*
CN-108907181-A (Year: 2018).*
CN-110846529-A (Year: 2020).*
CN-108320834-A (Year: 2018).*
CN-112725660-A (Year: 2021).*
The State Intellectual Property Office of People's Republic of China: Office Action (Year: 2021).*

* cited by examiner

*Primary Examiner* — Keith Walker
*Assistant Examiner* — Adil A. Siddiqui
(74) *Attorney, Agent, or Firm* — Bekiares Eliezer LLP

(57) ABSTRACT

A graphene-reinforced alloy composite material and a preparation method thereof are disclosed. The method includes preparing a porous graphene colloid, smelting a first-part alloy, pouring it into the porous graphene colloid to be formed, subjecting the formed product to a hot extrusion, and pulverizing into a powder I; smelting a second-part alloy into an alloy melt II, adding a high-purity silicon powder therein, mixing by stirring, and atomizing to obtain a powder II; mixing the powder I and the powder II, to obtain a pretreated alloy powder; placing the pretreated alloy powder in a high-purity ark, transferring the high-purity ark to a high-temperature tubular furnace, subjecting the pretreated alloy powder to a redox treatment, and introducing methane and hydrogen to grow graphene, to obtain a coated alloy powder; subjecting the coated alloy powder to a pre-compressing molding and sintering, to obtain the graphene-reinforced alloy composite material.

10 Claims, No Drawings

GRAPHENE-REINFORCED ALLOY COMPOSITE MATERIAL AND PREPARATION METHOD THEREOF

CROSS REFERENCE TO RELATED APPLICATION

This patent application claims the benefit and priority of Chinese Patent Application No. 202011444407.5 filed on Dec. 8, 2020, the disclosure of which is incorporated by reference herein in its entirety as part of the present application.

TECHNICAL FIELD

The present disclosure relates to the technical field of alloy materials, in particular to a graphene-reinforced alloy composite material and a preparation method thereof.

BACKGROUND ART

Alloy materials (such as aluminum alloys, copper alloys, and magnesium alloys) have the advantages of desirable electrical and thermal conductivity and easy to be formed, and are widely used in many fields. With the development of modern science and technology, traditional alloy materials could no longer meet the performance requirements of practical uses, especially the increasingly high strength requirements.

Graphene is a two-dimensional nano-material constituted of carbon atoms. Due to its unique two-dimensional honeycomb crystal structure and extremely-high bonding strength, graphene is currently known as the hardest material with the highest specific strength in the world. Graphene has a Young's modulus of about 1,100 GPa and a breaking strength of about 130 GPa, which are 6 times and 60 times than those of the best ultra-high-strength steels. Thus, graphene is regarded as an ideal filler for composite materials.

However, the bonding force between graphene and a metal matrix is weak, and graphene is prone to agglomerate in the metal matrix. Expected excellent performance could not be obtained by directly adding graphene to the alloy materials.

At present, there are two main methods to improve the bonding force between metal and graphene. One method is to plate a metal particle such as nickel, copper, and silver on the surface of graphene. However, this method mostly involves electroplating or electroless plating, which is complicated, and involves using a toxic and harmful chemical more or less, thereby being not conducive to environmental protection and safety. The other method is to introduce a functional group to the surface of graphene for surface modification. However, this method changes the surface structure of graphene, which would weaken the performance of graphene.

CN109234658B discloses a method for preparing a graphene-reinforced aluminum alloy composite material. In this method, a graphene composite powder was prepared first, then a prefabricated plate was prepared, and a friction stirring was conducted. However, during the friction stirring, the edges of the graphene would be damaged, thereby adversely affecting the mechanical properties of the resulting composite material.

SUMMARY

An object of the present disclosure is to provide a graphene-reinforced alloy composite material and a preparation method thereof, thereby effectively improving the mechanical properties of a product.

To achieve the above object, the present disclosure provides the following technical solutions.

The present disclosure provides a method for preparing a graphene-reinforced alloy composite material, comprising:

(1) preparing a porous graphene colloid by using an aqueous graphene oxide solution as a raw material, smelting a first-part alloy into an alloy melt I, pouring the alloy melt I into the porous graphene colloid to obtain a formed product, subjecting the formed product to a hot extrusion, and pulverizing into a powder I; smelting a second-part alloy into an alloy melt II, adding a high-purity silicon powder to the alloy melt II, mixing to be uniform by stirring, and atomizing by using a restricted annular-gap nozzle, to obtain a powder II; mixing the powder I and the powder II to be uniform, to obtain a pretreated alloy powder;

(2) placing the pretreated alloy powder in a high-purity ark, transferring the high-purity ark to a high-temperature tubular furnace, subjecting the pretreated alloy powder to a redox treatment, and introducing methane and hydrogen to grow graphene, to obtain a coated alloy powder; and (3) subjecting the coated alloy powder to a pre-compressing molding, and sintering to obtain the graphene-reinforced alloy composite material.

In some embodiments, in step (1), the alloy may be selected from the group consisting of an aluminum alloy, a copper alloy, and a magnesium alloy.

In some embodiments, in step (1), a mass ratio of the porous graphene colloid, the first-part alloy, the second-part alloy, and the high-purity silicon powder is in the range of (0.1-0.2):100:(700-800):(0.3-0.4).

In some embodiments, in step (1), the porous graphene colloid may be prepared by a process comprising:

adding 0.08-0.1 parts by weight of sodium silicate and 0.005-0.008 parts by weight of ascorbic acid to 1 part by weight of a 5-8 mg/mL aqueous graphene oxide solution, stirring and subjecting the resulting mixture to a reduction reaction to obtain a reduced product, and subjecting the reduced product to a post-treatment to obtain the porous graphene colloid.

In some embodiments, stirring and subjecting the resulting mixture to a reduction reaction may be conducted at 70-80° C. for 3-4 hours.

In some embodiments, subjecting the reduced product to a post-treatment may include lyophilizing the reduced product at −30° C. to −40° C. for 5-8 hours, and naturally air-drying for 3-4 days.

In some embodiments, in step (1), the hot extrusion may be conducted at 650-670° C. for 2-3 hours, with an extrusion ratio of 8.08 and an extrusion speed of 0.3-0.33 m/min.

In some embodiments, in step (1), the powder I may have a particle size of 80-100 mesh.

In some embodiments, in step (1), the restricted annular-gap nozzle may have a jet apex angle of 22-25°, and a gap width of 0.5-1 mm; the atomizing may be conducted at a pressure of 0.8-1 MPa.

In some embodiments, in step (2), the high-purity ark may be made of boron nitride or aluminum oxide.

In some embodiments, in step (2), the redox treatment may specifically include:

heating to 900-1,000° C. at a rate of 20-30° C./min under a condition of a flow of argon gas of 300-320 mL/min, introducing hydrogen at a flow of 20-30 mL/min, and maintaining at the temperature for 30-40 minutes.

In some embodiments, in step (2), introducing methane and hydrogen to grow graphene may specifically include:

simultaneously introducing methane and hydrogen at a flow of 50-60 mL/min, maintaining at a temperature for 2-3 minutes, stopping introducing methane and hydrogen, and uncovering the tubular furnace and naturally cooling to room temperature (25° C.) to obtain the coated alloy powder.

In some embodiments, in step (3), subjecting the coated alloy powder to a pre-compressing molding may specifically include:
  adding the coated alloy powder into a mold, and conducting a pre-compressing molding at a pressure of 10-12 MPa.

In some embodiments, in step (3), the sintering is conducted by a spark plasma sintering, which is conducted under conditions of:
  a heating rate of 30-40° C./min, a temperature of 600-700° C., a pressing pressure of 40-50 MPa, and a duration time of 5-7 minutes.

The present disclosure also provides a graphene-reinforced alloy composite material obtained by the method as described above.

Compared with the prior art, the present disclosure has the following beneficial effects:

(1) In the present disclosure, a porous graphene colloid is prepared by using an aqueous graphene oxide solution as a raw material, and a first-part alloy is smelt into an alloy melt I; the alloy melt I is poured into the porous graphene colloid to obtain a formed product; the formed product is subjected to a hot extrusion, and pulverized into a powder I; a second-part alloy is smelt into an alloy melt II; a high-purity silicon powder is added to the alloy melt II, and they are mixed to be uniform by stirring, and the resulting mixture is atomized by using a restricted annular-gap nozzle, to obtain a powder II; the powder I and the powder II are mixed to be uniform to obtain a pretreated alloy powder; the pretreated alloy powder is placed in a high-purity ark, and the high-purity ark is transferred to a high-temperature tubular furnace; the pretreated alloy powder is subjected to a redox treatment, and then methane and hydrogen are introduced to grow graphene, to obtain a coated alloy powder; the coated alloy powder is subjected to a pre-compressing molding and sintered to obtain the graphene-reinforced alloy composite material. The present disclosure makes it possible to effectively improve the mechanical properties of a product.

(2) In the present disclosure, the alloy is divided into two parts, and the two parts are processed separately. One part of the alloy is mixed with a porous graphene colloid, such that the graphene is uniformly dispersed therein and the graphene and a eutectic structure are uniformly dispersed. The other part of the alloy is added with a high-purity silicon, which has a desirable compatibility with graphene, thereby promoting the mixing of the first-part alloy containing graphene with the second-part alloy to be uniform, and synergistically improving the mechanical properties.

(3) In the present disclosure, the pretreated alloy powder is placed in a high-purity ark, and the high-purity ark is transferred to a high-temperature tubular furnace, and the pretreated alloy powder is subjected to a redox treatment; then methane and hydrogen are introduced to grow graphene on the surface of the pretreated alloy powder, allowing the pretreated alloy powder to be coated with graphene, thereby further improving the mechanical properties of a product. Since graphene has been introduced into the pretreated alloy powder, the mechanical properties could be guaranteed on the basis of reducing the amount of coating.

DETAILED DESCRIPTION OF THE EMBODIMENTS

The technical solutions in the embodiments of the present disclosure are clearly and completely described below. Apparently, the described embodiments are merely some rather than all of the embodiments of the present disclosure. All other embodiments obtained by those of ordinary skill in the art on the basis of the embodiments of the present disclosure without creative efforts shall fall within the protection scope of the present disclosure.

For comparison, a copper alloy powder (a copper-zinc-nickel alloy powder), commercially available from Tianjin Zhuxin Metal Materials Co., Ltd., China, was used as the alloy in the examples and comparative examples. The high-purity silicon used was purchased from Zhongnuo Advanced Material (Beijing) Technology Co., Ltd., China.

Example 1

A graphene-reinforced alloy composite material was prepared according to the following procedures:

(1) A porous graphene colloid was prepared using an aqueous graphene oxide solution as a raw material. A first-part alloy was smelted into an alloy melt I, and the alloy melt I was poured into the porous graphene colloid, obtaining a formed product. The formed product was subjected to a hot extrusion, and pulverized into a powder I. Meanwhile, a second-part alloy was smelted into an alloy melt II, and a high-purity silicon powder was added to the alloy melt II, and they were mixed to be uniform by stirring. The resulting mixture was atomized by using a restricted annular-gap nozzle, obtaining a powder II. The powder I and the powder II were mixed to be uniform, obtaining a pretreated alloy powder.

(2) The pretreated alloy powder was placed in a high-purity ark, and the high-purity ark was transferred to a high-temperature tubular furnace. The pretreated alloy powder was subjected to a redox treatment. Methane and hydrogen were then introduced to grow graphene, obtaining a coated alloy powder.

(3) The coated alloy powder was subjected to a pre-compressing molding and sintered, obtaining the graphene-reinforced alloy composite material.

In step (1), a mass ratio of the porous graphene colloid, the first-part alloy, the second-part alloy, and the high-purity silicon powder was 0.1:100:800:0.3.

In step (1), the porous graphene colloid was prepared by the following process:
  0.08 kg of sodium silicate and 0.008 kg of ascorbic acid were added to 1 kg of 8 mg/mL aqueous graphene oxide solution, and they were stirred and subjected to a reduction reaction at 70° C. for 4 hours, obtaining a reduced product. The reduced product was subjected to a post-treatment (lyophilizing the reduced product at −30° C. for 8 hours, and naturally air-drying for 3 days), finally obtaining the porous graphene colloid.

In step (1), the hot extrusion was conducted at 670° C. for 2 hours, with an extrusion ratio of 8.08 and an extrusion speed of 0.33 m/min.

In step (1), the powder I had a particle size of 80 mesh.

In step (1), the restricted annular-gap nozzle had a jet apex angle of 25°, and a gap width of 0.5 mm; the atomizing was conducted at a pressure of 1 MPa.

In step (2), the high-purity ark was made of boron nitride.

In step (2), the redox treatment was conducted as follows: the pretreated alloy powder was heated to 900° C. at a rate of 30° C./min under a condition of a flow of argon gas of 300 mL/min; hydrogen was introduced at a flow of 30 mL/min, and they were maintained at the temperature for 30 minutes.

In step (2), the procedure that methane and hydrogen were introduced to grow graphene was performed as follows:

methane and hydrogen was simultaneously introduced at a flow of 60 mL/min, and they were maintained at a temperature for 2 minutes; methane and hydrogen were stopped introducing, and the tubular furnace was uncovered and naturally cooled to room temperature (25° C.), obtaining the coated alloy powder.

In step (3), the pre-compressing molding was conducted as follows: the coated alloy powder was added into a mold, and subjected to a pre-compressing molding at a pressure of 12 MPa.

In step (3), the sintering was conducted by a spark plasma sintering under conditions of a heating rate of 30° C./min, a temperature of 700° C., a pressing pressure of 40 MPa, and a duration time of 7 minutes.

Example 2

A graphene-reinforced alloy composite material was prepared according to the following procedures:

(1) A porous graphene colloid was prepared using an aqueous graphene oxide solution as a raw material. A first-part alloy was smelted into an alloy melt I, and the alloy melt I was poured into the porous graphene colloid, obtaining a formed product. The formed product was subjected to a hot extrusion, and pulverized into a powder I. Meanwhile, a second-part alloy was smelted into an alloy melt II, and a high-purity silicon powder was added to the alloy melt II, and they were mixed to be uniform by stirring. The resulting mixture was atomized by using a restricted annular-gap nozzle, obtaining a powder II. The powder I and the powder II were mixed to be uniform, obtaining a pretreated alloy powder.

(2) The pretreated alloy powder was placed in a high-purity ark, and the high-purity ark was transferred to a high-temperature tubular furnace. The pretreated alloy powder was subjected to a redox treatment. Methane and hydrogen was then introduced to grow graphene, obtaining a coated alloy powder.

(3) The coated alloy powder was subjected to a pre-compressing molding and sintered, obtaining the graphene-reinforced alloy composite material.

In step (1), a mass ratio of the porous graphene colloid, the first-part alloy, the second-part alloy, and the high-purity silicon powder was 0.2:100:700:0.4.

In step (1), the porous graphene colloid was prepared according to the following process:

0.1 kg of sodium silicate and 0.005 kg of ascorbic acid were added to 1 kg of 5 mg/mL aqueous graphene oxide solution, and they were stirred and subjected to a reduction reaction at 80° C. for 3 hours, obtaining a reduced product. The reduced product was subjected to a post-treatment (lyophilizing the reduced product at −40° C. for 5 hours, and naturally air-drying for 4 days), finally obtaining the porous graphene colloid.

In step (1), the hot extrusion was conducted at 650° C. for 3 hours, with an extrusion ratio of 8.08 and an extrusion speed of 0.3 m/min.

In step (1), the powder I had a particle size of 100 mesh.

In step (1), the restricted annular-gap nozzle had a jet apex angle of 22°, and a gap width of 1 mm; the atomizing was conducted at a pressure of 0.8 MPa.

In step (2), the high-purity ark was made of aluminum oxide.

In step (2), the redox treatment was conducted as follows: the pretreated alloy powder was heated to 1,000° C. at a rate of 20° C./min under conditions of a flow of argon gas of 320 mL/min; hydrogen was introduced at a flow of 20 mL/min, and they were maintained at the temperature for 40 minutes.

In step (2), the procedure that methane and hydrogen were introduced to grow graphene was performed as follows: methane and hydrogen was simultaneously introduced at a flow of 50 mL/min, and they were maintained at a temperature for 3 minutes; methane and hydrogen were stopped introducing, and the tubular furnace was uncovered and naturally cooled to room temperature (25° C.), obtaining the coated alloy powder.

In step (3), the pre-compressing molding was conducted as follows: the coated alloy powder was added into a mold, and subjected to a pre-compressing molding at a pressure of 10 MPa.

In step (3), the sintering was conducted by a spark plasma sintering under conditions of a heating rate of 40° C./min, a temperature of 600° C., a pressing pressure of 50 MPa, and a duration time of 5 minutes.

Example 3

A graphene-reinforced alloy composite material was prepared according to the following procedures:

(1) A porous graphene colloid was prepared using an aqueous graphene oxide solution as a raw material. A first-part alloy was smelted into an alloy melt I, and the alloy melt I was poured into the porous graphene colloid, obtaining a formed product. The formed product was subjected to a hot extrusion, and pulverized into a powder I. Meanwhile, a second-part alloy was smelted into an alloy melt II, and a high-purity silicon powder was added to the alloy melt II, and they were mixed to be uniform by stirring. The resulting mixture was atomized by using a restricted annular-gap nozzle, obtaining a powder II. The powder I and the powder II were mixed to be uniform, obtaining a pretreated alloy powder.

(2) The pretreated alloy powder was placed in a high-purity ark, and the high-purity ark was transferred to a high-temperature tubular furnace. The pretreated alloy powder was subjected to a redox treatment. Methane and hydrogen were then introduced to grow graphene, obtaining a coated alloy powder.

(3) The coated alloy powder was subjected to a pre-compressing molding and sintered, obtaining the graphene-reinforced alloy composite material.

In step (1), a mass ratio of the porous graphene colloid, the first-part alloy, the second-part alloy, and the high-purity silicon powder was 0.15:100:750:0.35.

In step (1), the porous graphene colloid was prepared by the following process:

0.09 kg of sodium silicate and 0.007 kg of ascorbic acid were added to 1 kg of 6 mg/mL aqueous graphene oxide solution, and they were stirred and subjected to a reduction reaction at 75° C. for 3.5 hours, obtaining a reduced product. The reduced product was subjected to a post-treatment (lyophilizing the resulting product at −35° C. for 6 hours, and naturally air-drying for 3 days), finally obtaining the porous graphene colloid.

In step (1), the hot extrusion was conducted at 660° C. for 2.5 hours, with an extrusion ratio of 8.08 and an extrusion speed of 0.31 m/min.

In step (1), the powder I had a particle size of 90 mesh.

In step (1), the restricted annular-gap nozzle had a jet apex angle of 23°, and a gap width of 0.6 mm; the atomizing was conducted at a pressure of 0.9 MPa.

In step (2), the high-purity ark was made of boron nitride.

In step (2), the redox treatment was conducted as follows: the pretreated alloy powder was heated to 950° C. at a rate of 25° C./min under a condition of a flow of argon gas of 310 mL/min; hydrogen was introduced at a flow of 25 mL/min, and they were maintained at the temperature for 35 minutes.

In step (2), the procedure that methane and hydrogen were introduced to grow graphene was performed as follows: methane and hydrogen were simultaneously introduced at a flow of 55 mL/min, and they were maintained at a temperature for 2.5 minutes. Methane and hydrogen were stopped introducing, and the tubular furnace was uncovered and naturally cooled to room temperature (25° C.), obtaining the coated alloy powder.

In step (3), the pre-compressing molding was conducted as follows: the coated alloy powder was added into a mold, and subjected to a pre-compressing molding at a pressure of 11 MPa.

In step (3), the sintering was conducted by a spark plasma sintering under conditions of a heating rate of 35° C./min, a temperature of 650° C., a pressing pressure of 45 MPa, and a duration of 6 minutes.

Comparative Example 1

A graphene-reinforced alloy composite material was prepared according to the following procedures:

(1) A porous graphene colloid was prepared using an aqueous graphene oxide solution as a raw material. A first-part alloy was smelted into an alloy melt I, and the alloy melt I was poured into the porous graphene colloid, obtaining a formed product. The formed product was subjected to a hot extrusion, and pulverized into a powder I. The powder I and a second-part alloy were mixed to be uniform, obtaining a pretreated alloy powder.

(2) The pretreated alloy powder was placed in a high-purity ark, and the high-purity ark was transferred to a high-temperature tubular furnace. The pretreated alloy powder was subjected to a redox treatment. Methane and hydrogen were then introduced to grow graphene, obtaining a coated alloy powder.

(3) The coated alloy powder was subjected to a pre-compressing molding and sintered, obtaining the graphene-reinforced alloy composite material.

In step (1), a mass ratio of the porous graphene colloid, the first-part alloy, and the second-part alloy was 0.1:100:800.

In step (1), the porous graphene colloid was prepared by the following process: 0.08 kg of sodium silicate and 0.008 kg of ascorbic acid were added to 1 kg of 8 mg/mL aqueous graphene oxide solution, and they were stirred and subjected to a reduction reaction at 70° C. for 4 hours, obtaining a reduced product. The reduced product was subjected to a post-treatment (lyophilizing the resulting product at −30° C. for 8 hours, and naturally air-drying for 3 days), finally obtaining the porous graphene colloid.

In step (1), the hot extrusion was conducted at 670° C. for 2 hours, with an extrusion ratio of 8.08 and an extrusion speed of 0.33 m/min.

In step (1), the powder I had a particle size of 80 mesh.

In step (2), the high-purity ark was made of boron nitride.

In step (2), the redox treatment was conducted as follows: The pretreated alloy powder was heated to 900° C. at a rate of 30° C./min under a condition of a flow of argon gas of 300 mL/min. Hydrogen was introduced at a flow of 30 mL/min, and they were maintained at the temperature for 30 minutes.

In step (2), the procedure that methane and hydrogen were introduced to grow graphene was performed as follows: Methane and hydrogen were simultaneously introduced at a flow of 60 mL/min, and they were maintained at a temperature for 2 minutes. Methane and hydrogen were stopped introducing, and the tubular furnace was uncovered and naturally cooled to room temperature (25° C.), obtaining the coated alloy powder.

In step (3), the pre-compressing molding was conducted as follows: the coated alloy powder was added into a mold, and subjected to a pre-compressing molding at a pressure of 12 MPa.

In step (3), the sintering was conducted by a spark plasma sintering under conditions of a heating rate of 30° C./min, a temperature of 700° C., a pressing pressure of 40 MPa, and a duration time of 7 minutes.

Comparative Example 2

A graphene-reinforced alloy composite material was prepared according to the following procedures:

(1) An alloy was placed in a high-purity ark, and the high-purity ark was transferred to a high-temperature tubular furnace. The pretreated alloy powder was subjected to a redox treatment. Methane and hydrogen was then introduced to grow graphene, obtaining a coated alloy powder.

(2) The coated alloy powder was subjected to a pre-compressing molding and sintered, obtaining the graphene-reinforced alloy composite material.

In step (1), the high-purity ark was made of boron nitride.

In step (1), the redox treatment was conducted as follows: The pretreated alloy powder was heated to 900° C. at a rate of 30° C./min under a condition of a flow of argon gas of 300 mL/min. Hydrogen was introduced at a flow of 30 mL/min, and they were maintained at the temperature for 30 minutes.

In step (1), the procedure that methane and hydrogen were introduced to grow graphene was performed as follows: Methane and hydrogen were simultaneously introduced at a flow of 60 mL/min, and they were maintained at a temperature for 2 minutes. Methane and hydrogen were stopped introducing, and the tubular furnace was uncovered and naturally cooled to room temperature (25° C.), obtaining the coated alloy powder.

In step (2), the pre-compressing molding was conducted as follows: the coated alloy powder was added into a mold, and subjected to a pre-compressing molding at a pressure of 12 MPa.

In step (2), the sintering was conducted by a spark plasma sintering under conditions of a heating rate of 30° C./min, a temperature of 700° C., a pressing pressure of 40 MPa, and a duration time of 7 minutes.

Comparative Example 3

A graphene-reinforced alloy composite material was prepared according to the following procedures:

(1) A porous graphene colloid was prepared using an aqueous graphene oxide solution as a raw material. A first-part alloy was smelted into an alloy melt I, and the alloy melt I was poured into the porous graphene colloid, obtaining a formed product. The formed product was subjected to a hot extrusion, and pulverized into a powder I. Meanwhile, a second-part alloy was smelted into an alloy melt II. A high-purity silicon powder was then added to the alloy melt II, and they were mixed to be uniform by stirring. The resulting mixture was atomized by using a restricted annular-gap nozzle, obtaining a powder II. The powder I and the powder II were mixed to be uniform, obtaining a pretreated alloy powder.

(2) The pretreated alloy powder was subjected to a pre-compressing molding and sintered, obtaining the graphene-reinforced alloy composite material.

In step (1), a mass ratio of the porous graphene colloid, the first-part alloy, the second-part alloy, and the high-purity silicon powder was 0.1:100:800:0.3.

In step (1), the porous graphene colloid was prepared according to the following process: 0.08 kg of sodium silicate and 0.008 kg of ascorbic acid were added to 1 kg of 8 mg/mL aqueous graphene oxide solution, and they were stirred and subjected to a reduction reaction at 70° C. for 4 hours, obtaining a reduced product. The reduced product was subjected to a post-treatment (lyophilizing the resulting product at −30° C. for 8 hours, and naturally air-drying for 3 days), finally obtaining the porous graphene colloid.

In step (1), the hot extrusion was conducted at 670° C. for 2 hours, with an extrusion ratio of 8.08 and an extrusion speed of 0.33 m/min.

In step (1), the powder I had a particle size of 80 mesh.

In step (1), the restricted annular-gap nozzle had a jet apex angle of 25°, and a gap width of 0.5 mm; the atomizing was conducted at a pressure of 1 MPa.

In step (3), the pre-compressing molding was conducted as follows: the pretreated alloy powder was added into a mold, and subjected to a pre-compressing molding at a pressure of 12 MPa.

In step (3), the sintering was conducted by a spark plasma sintering under conditions of a heating rate of 30° C./min, a temperature of 700° C., a pressing pressure of 40 MPa, and a duration time of 7 minutes.

Test Examples

The alloy composite materials of Examples 1 to 3 and Comparative Examples 1 to 3 were made into plates with a thickness of 2 mm. The original alloy was used as a control group, in which the alloy was added to a mold, subjected to a pre-compressing molding at a pressure of 12 MPa, and sintered by a spark plasma sintering under conditions of a heating rate of 30° C./min, a temperature of 700° C., a pressing pressure of 40 MPa, and a duration time of 7 minutes.

They were subjected to a yield strength and compressive strength test according to GB/T23370-2009. The results are shown in Table 1.

TABLE 1

Comparison of mechanical properties

|  | Yield strength (MPa) | Compressive strength (MPa) |
| --- | --- | --- |
| Control Group | 101 | 129 |
| Example 1 | 321 | 368 |
| Example 2 | 326 | 370 |
| Example 3 | 339 | 375 |
| Comparative Example 1 | 290 | 304 |
| Comparative Example 2 | 223 | 238 |
| Comparative Example 3 | 235 | 250 |

It can be seen from Table 1 that compared with the control group, the mechanical properties of the composite materials obtained in Examples 1 to 3 are significantly improved.

In Comparative Example 1, the powder II was replaced with the alloy, and a high-purity silicon powder was not added for reinforcement treatment. In Comparative Example 2, the treatment process of step (1) was omitted, and the pretreated alloy powder was directly replaced with the alloy. In Comparative Example 3, the redox process of step (2) was omitted, and the graphene-growth process was not conducted. Accordingly, the mechanical properties of the obtained alloy materials are obviously deteriorated, indicating that the pre-doping of graphene in the alloy, the introduction of high-purity silicon and the surface coating treatment (i.e. the graphene-growth process) synergistically results in improved the mechanical properties of the product.

It is apparent for those skilled in the art that the present disclosure is not limited to details of the above exemplary embodiments, and that the present disclosure may be implemented in other specific forms without departing from the spirit or basic features of the present disclosure. The embodiments should be regarded as exemplary and non-limiting in every respect, and the scope of the present disclosure is defined by the appended claims rather than the above description. Therefore, all changes falling within the meaning and scope of equivalent elements of the claims should be included in the present disclosure.

It should be understood that although this specification is described in accordance with the implementations, not every implementation includes only one independent technical solution. Such a description is merely for the sake of clarity, and those skilled in the art should take this specification as a whole. The technical solutions in the embodiments could also be appropriately combined to form other implementations which are comprehensible for those skilled in the art.

What is claimed is:

1. A method for preparing a graphene-reinforced alloy composite material, comprising:
   (1) preparing a porous graphene colloid by using an aqueous graphene oxide solution as a raw material, smelting a first-part alloy into an alloy melt I, pouring the alloy melt I into the porous graphene colloid to obtain a formed product, subjecting the formed product to a hot extrusion, and pulverizing into a powder I; smelting a second-part alloy into an alloy melt II, adding a high-purity silicon powder to the alloy melt II, mixing to be uniform by stirring, and atomizing by using a restricted annular-gap nozzle, to obtain a powder II; mixing the powder I and the powder II to be uniform, to obtain a pretreated alloy powder;
   (2) placing the pretreated alloy powder in a high-purity ark, transferring the high-purity ark to a high-temperature tubular furnace, subjecting the pretreated alloy powder to a redox treatment, and introducing methane and hydrogen to grow graphene, to obtain a coated alloy powder; and
   (3) subjecting the coated alloy powder to a pre-compressing molding, and sintering, to obtain the graphene-reinforced alloy composite material.

2. The method as claimed in claim 1, wherein in step (1), a mass ratio of the porous graphene colloid, the first-part alloy, the second-part alloy, and the high-purity silicon powder is in the range of (0.1-0.2):100:(700-800):(0.3-0.4).

3. The method as claimed in claim 1, wherein in step (1), the porous graphene colloid is prepared by a process comprising:
   adding 0.08-0.1 parts by weight of sodium silicate and 0.005-0.008 parts by weight of ascorbic acid to 1 part by weight of 5-8 mg/mL aqueous graphene oxide solution, stirring and subjecting the resulting mixture to a reduction reaction to obtain a reduced product, and subjecting the reduced product to a post-treatment, to obtain the porous graphene colloid.

4. The method as claimed in claim 1, wherein in step (1), the hot extrusion is conducted at 650-670° C. for 2-3 hours with an extrusion ratio of 8.08 and an extrusion speed of 0.3-0.33 m/min.

5. The method as claimed in claim 1, wherein in step (1), the restricted annular-gap nozzle has a jet apex angle of 22-25°, and a gap width of 0.5-1 mm; the atomizing is conducted at a pressure of 0.8-1 MPa.

6. The method as claimed in claim 1, wherein in step (2), the redox treatment comprises:
heating to 900-1,000° C. at a rate of 20-30° C./min under a condition of a flow of argon gas of 300-320 mL/min, introducing hydrogen at a flow of 20-30 mL/min, and maintaining at the temperature for 30-40 minutes.

7. The method as claimed in claim 1, wherein in step (2), introducing methane and hydrogen to grow graphene comprises:
simultaneously introducing methane and hydrogen at a flow of 50-60 mL/min, maintaining at a temperature for 2-3 minutes, stopping introducing methane and hydrogen, and uncovering the tubular furnace and naturally cooling to room temperature, to obtain the coated alloy powder.

8. The method as claimed in claim 1, wherein in step (3), subjecting the coated alloy powder to a pre-compressing molding comprises:
adding the coated alloy powder into a mold, and conducting a pre-compressing molding at a pressure of 10-12 MPa.

9. The method as claimed in claim 1, wherein in step (3), the sintering is conducted by a spark plasma sintering under conditions of:
a heating rate of 30-40° C./min, a temperature of 600-700° C., a pressing pressure of 40-50 MPa, and a duration time of 5-7 minutes.

10. A graphene-reinforced alloy composite material obtained by the method as claimed in claim 1.

* * * * *